(12) United States Patent
Tokgoz et al.

(10) Patent No.: US 9,008,015 B2
(45) Date of Patent: Apr. 14, 2015

(54) APPARATUS AND METHOD FOR MOBILE ASSISTED REVERSE LINK INTERFERENCE MANAGEMENT

(75) Inventors: Yeliz Tokgoz, San Diego, CA (US); Mehmet Yavuz, San Diego, CA (US); Vansh Pal Singh Makh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 13/415,749

(22) Filed: Mar. 8, 2012

(65) Prior Publication Data

US 2013/0064189 A1 Mar. 14, 2013

Related U.S. Application Data

(60) Provisional application No. 61/452,010, filed on Mar. 11, 2011.

(51) Int. Cl.
| | |
|---|---|
| *H04W 4/00* | (2009.01) |
| *H04W 28/22* | (2009.01) |
| *H04W 16/10* | (2009.01) |
| *H04L 1/00* | (2006.01) |
| *H04B 1/10* | (2006.01) |
| *H04W 52/04* | (2009.01) |

(Continued)

(52) U.S. Cl.
CPC ............... *H04W 28/22* (2013.01); *H04B 1/10* (2013.01); *H04W 16/10* (2013.01); *H04W 52/04* (2013.01); *H04W 24/10* (2013.01); *H04W 28/048* (2013.01); *H04W 48/08* (2013.01); *H04W 72/082* (2013.01); *H04W 84/045* (2013.01); *H04W 88/08* (2013.01); *H04L 1/0002* (2013.01); *H04L 1/0025* (2013.01); *H04L 2001/0097* (2013.01)

(58) Field of Classification Search
None
See application file for complete search history.

(56) References Cited

U.S. PATENT DOCUMENTS

| 7,215,653 B2 * | 5/2007 | Kim et al. ............. 370/329 |
| 7,813,753 B2 * | 10/2010 | Santhanam ............. 455/522 |

(Continued)

FOREIGN PATENT DOCUMENTS

| EP | 1231807 | 8/2002 |
| JP | 2011514718 A | 5/2011 |

(Continued)

OTHER PUBLICATIONS

International Search Report and Written Opinion—PCT/US2012/028635—ISA/EPO—Jun. 19, 2012.

(Continued)

*Primary Examiner* — Timothy J Weidner

(57) ABSTRACT

Techniques are provided for mobile assisted reverse link interference management. For example, a method for providing mobile assisted reverse link (RL) interference management includes requesting at least one pilot strength measurement from a user device. The method may include receiving at least one macrocell pilot strength measurement or femtocell pilot or beacon strength measurement from the user device in response to the request. The method may include determining a data rate allocation for the user device based at least in part on the at least one macrocell pilot strength measurement or femtocell pilot or beacon strength measurement. The method may include transmitting the data rate allocation to the user device, thereby controlling RL interference caused by the user device to at least one non-serving cell.

7 Claims, 9 Drawing Sheets

(51) Int. Cl.
  *H04W 24/10*  (2009.01)
  *H04W 28/04*  (2009.01)
  *H04W 48/08*  (2009.01)
  *H04W 72/08*  (2009.01)
  *H04W 84/04*  (2009.01)
  *H04W 88/08*  (2009.01)

(56) References Cited

U.S. PATENT DOCUMENTS

| | | | |
|---|---|---|---|
| 7,974,253 B2 | 7/2011 | Laroia et al. | |
| 8,160,629 B2* | 4/2012 | Mate et al. | 455/522 |
| 8,175,604 B2* | 5/2012 | Lohr et al. | 455/442 |
| 8,676,125 B2* | 3/2014 | Nanda et al. | 455/63.1 |
| 2004/0102194 A1* | 5/2004 | Naghian et al. | 455/436 |
| 2006/0203772 A1 | 9/2006 | Laroia et al. | |
| 2006/0229089 A1* | 10/2006 | Tokgoz et al. | 455/501 |
| 2007/0086379 A1* | 4/2007 | Takayanagi et al. | 370/329 |
| 2009/0103507 A1* | 4/2009 | Gu et al. | 370/342 |
| 2009/0137241 A1* | 5/2009 | Yavuz et al. | 455/423 |
| 2009/0247164 A1* | 10/2009 | Kandukuri Narayan et al. | 455/436 |
| 2009/0285113 A1* | 11/2009 | Yavuz et al. | 370/252 |
| 2010/0039948 A1* | 2/2010 | Agrawal et al. | 370/252 |
| 2011/0319084 A1* | 12/2011 | Meshkati et al. | 455/436 |
| 2011/0319122 A1 | 12/2011 | Zhou et al. | |
| 2012/0021788 A1* | 1/2012 | Yavuz et al. | 455/501 |
| 2012/0252521 A1* | 10/2012 | Nagaraja et al. | 455/522 |
| 2012/0258746 A1* | 10/2012 | Tokgoz et al. | 455/501 |
| 2012/0329399 A1* | 12/2012 | Tokgoz et al. | 455/63.1 |
| 2013/0064189 A1* | 3/2013 | Tokgoz et al. | 370/329 |
| 2013/0102309 A1* | 4/2013 | Chande et al. | 455/435.1 |

FOREIGN PATENT DOCUMENTS

| | | |
|---|---|---|
| WO | WO-2006096887 | 9/2006 |
| WO | 2010006909 A1 | 1/2010 |

OTHER PUBLICATIONS

Taiwan Search Report—TW101108330—TIPO—Mar. 3, 2014.

* cited by examiner

APPARATUS AND METHOD FOR MOBILE ASSISTED REVERSE LINK INTERFERENCE MANAGEMENT

CROSS-REFERENCE TO RELATED APPLICATION

The present application for patent claims priority to Provisional Application No. 61/452,010, filed Mar. 11, 2011, entitled "APPARATUS AND METHOD FOR MOBILE ASSISTED REVERSE LINK INTERFERENCE MANAGEMENT", which is assigned to the assignee hereof, and is hereby expressly incorporated in its entirety by reference herein.

BACKGROUND

1. Field

This disclosure relates generally to apparatus and methods for wireless communication. More particularly, the disclosure relates to reverse link interference management.

2. Background

Femtocells, microcells and picocells are low power cellular base stations typically deployed indoors in residential and enterprise environments as well as hotspots in order to improve voice and high rate data coverage and provide excellent user experience. The cellular operator benefits from reduced infrastructure deployment costs for capacity upgrades and coverage improvements. While improving performance, femtocells, microcells and picocells may cause some interference to other users in the network.

For example, a femtocell user may be referred to as a Home User Equipment (HUE) or a Home Access Terminal (HAT). Similarly, a macro network user is a MUE or a MAT. Femtocells are denoted either as Home Node B (HNB) or Home Access Point (HAP), whereas macro base stations are called Macro Node B (MNB) or Macro Access Point (MAP). Total received signal strength to thermal noise ratio is defined as Rise Over Thermal (RoT) or noise rise. Conforming to 3GPP terminology, a macro sector will be referred to as a cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed is an apparatus and method for providing mobile assisted reverse link (RL) interference management. According to one aspect, a method for providing mobile assisted reverse link (RL) interference management includes requesting at least one pilot strength measurement from a user device; receiving at least one macrocell pilot strength measurement or femtocell pilot or beacon strength measurement from the user device in response to the request; determining a data rate allocation for the user device based at least in part on the at least one macrocell pilot strength measurement or femtocell pilot or beacon strength measurement; and transmitting the data rate allocation to the user device, thereby controlling RL interference caused by the user device to at least one non-serving cell.

According to another aspect, an access point for providing mobile assisted reverse link (RL) interference management includes a request module configure to request at least one pilot strength measurement from a user device; a receiver configured to receive at least one macrocell pilot strength measurement or femtocell pilot or beacon strength measurement from the user device in response to the request; a determination module configure to determine a data rate allocation for the user device based at least in part on the at least one macrocell pilot strength measurement or femtocell pilot or beacon strength measurement; and a transmitter configured to transmit the data rate allocation to the user device, thereby controlling RL interference caused by the user device to at least one non-serving cell.

According to another aspect, an apparatus for providing mobile assisted reverse link (RL) interference management includes means for requesting at least one pilot strength measurement from a user device; means for receiving at least one macrocell pilot strength measurement or femtocell pilot or beacon strength measurement from the user device in response to the request; means for determining a data rate allocation for the user device based at least in part on the at least one macrocell pilot strength measurement or femtocell pilot or beacon strength measurement; and means for transmitting the data rate allocation to the user device, thereby controlling RL interference caused by the user device to at least one non-serving cell.

According to another aspect, a computer-program product includes computer-readable medium including code for causing at least one computer to request at least one pilot strength measurement from a user device; receive at least one macrocell pilot strength measurement or femtocell pilot or beacon strength measurement from the user device in response to the request; determine a data rate allocation for the user device based at least in part on the at least one macrocell pilot strength measurement or femtocell pilot or beacon strength measurement; and transmit the data rate allocation to the user device, thereby controlling RL interference caused by the user device to at least one non-serving cell.

According to another aspect, a method for providing mobile assisted reverse link (RL) interference management includes receiving a data rate allocation from a source cell, wherein the data rate allocation is derived based on pilot or beacon strength measurements; and adjusting one or more of a traffic power level or a data rate transmission based on the received data rate allocation from the source cell, thereby controlling RL interference to at least one non-serving cell.

According to another aspect, a user equipment for providing mobile assisted reverse link (RL) interference management includes a receiver configure to receive a data rate allocation from a source cell, wherein the data rate allocation is derived based on pilot or beacon strength measurements; and an adjustment module configure to adjust one or more of a traffic power level or a data rate transmission based on the received data rate allocation from the source cell, thereby controlling RL interference to at least one non-serving cell.

According to another aspect, an apparatus for providing mobile assisted reverse link (RL) interference management includes means for receiving a data rate allocation from a source cell, wherein the data rate allocation is derived based on pilot or beacon strength measurements; and means for adjusting one or more of a traffic power level or a data rate transmission based on the received data rate allocation from the source cell, thereby controlling RL interference to at least one non-serving cell.

According to another aspect, a computer-program product includes computer-readable medium including code for causing at least one computer to receive a data rate allocation from a source cell, wherein the data rate allocation is derived based on pilot or beacon strength measurements; and adjust one or more of a traffic power level or a data rate transmission based on the received data rate allocation from the source cell, thereby controlling RL interference to at least one non-serving cell.

Advantages of the present disclosure may include greater compatibility between macrocells and low power base stations (e.g., femtocells, microcells, picocells, etc.) by improved interference management.

It is understood that other aspects will become readily apparent to those skilled in the art from the following detailed description, wherein it is shown and described various aspects by way of illustration. The drawings and detailed description are to be regarded as illustrative in nature and not as restrictive.

DESCRIPTION

Figure 1:
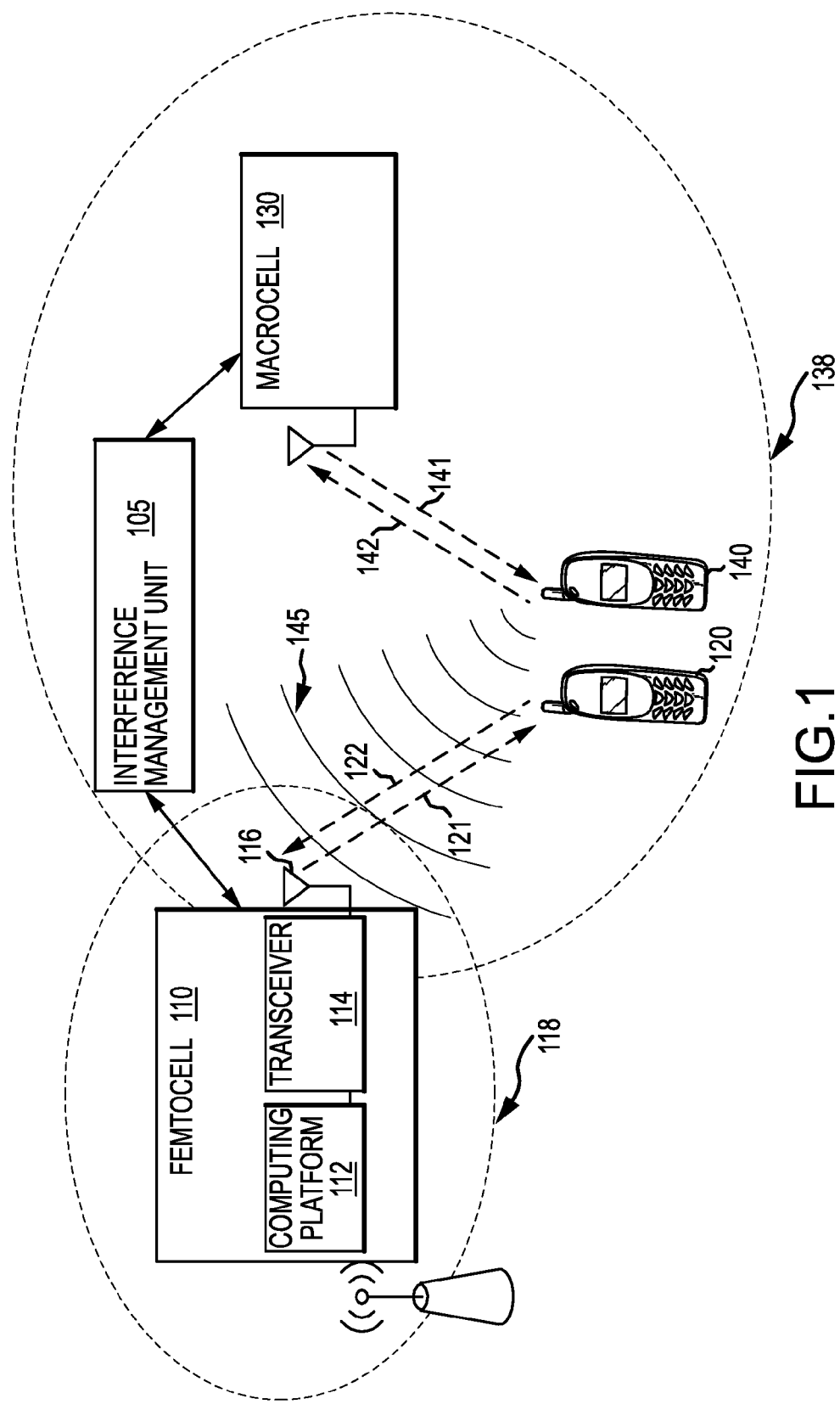
FIG. 1 illustrates an example schematic diagram of a heterogeneous wireless communication system having an interference management system to mitigate interference between a femtocell and a macrocell.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

In wireless systems with both macrocells and femtocells, the femtocell users may cause interference to the macrocells, while the macrocell users may also interfere with the nearby femtocells. In the present innovation, mobile assisted reverse link (RL) interference management methods and apparatus are disclosed to alleviate or eliminate the interference mentioned above. These methods may be generally applied to various wireless systems, such as but not limited to, WCDMA/HSPA (UMTS), 1xDO, LTE, WiMax.

In one example, existing wireless networks, such as macro wireless networks, may be supplemented by low power base station deployments to improve coverage area and overall communication performance. For example, the low power base stations are known as microcells, picocells, and femtocells. The present disclosure will refer to femtocells which are low power small base stations that connect to a macro wireless network through a femto gateway. However, apparatus and methods described in the present disclosure may also be applicable to other types of low power base stations (e.g., microcells, picocells, etc.).

Various aspects are described herein in connection with a user device. A user device may also be called a system, a subscriber unit, a subscriber station, a mobile station, a cellular device, a multi-mode device, a remote station, a remote terminal, an access terminal, a user terminal, a user agent, a user equipment, a mobile device, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

FIG. 1 illustrates an example schematic diagram of a heterogeneous wireless communication system 100 having an interference management (IM) unit 105 to mitigate interference between a femtocell 110 and a macrocell 130. Although the femtocell is illustrated in FIG. 1, one skilled in the art would understand that the illustration could apply to other low power base stations such as microcells, picocells, etc.

In one example, the IM unit 105 resides wholly or in part in the femtocell 110, femto user equipment (FUE) 120, macrocell 130 or macro user equipment (MUE) 140. For example, the IM unit 105 may be executed by a respective computing platform 112 residing in the femtocell 110 to communicate via transceiver 114 transmitting over antenna 116. The IM unit 105 unilaterally or collaboratively executes methods to mitigate reverse link 122 (a.k.a. uplink) interference 145 caused by a macro user equipment (MUE) 140 to the femtocell 110. In addition, the IM unit 105 mitigates reverse link interference caused by the femtocell user equipment (FUE) 120 to the macrocell 130. Also illustrated in FIG. 1 are the following: a forward link 121 (a.k.a. downlink (DL)) from the femtocell 110 to the femto user equipment (FUE) 120, a macrocell 130, a macro user equipment (MUE) 140, and a reverse link 142 and a forward link 141 between the macrocell 130 and the macro user equipment (MUE) 140. In one aspect, the FUE 120 and MUE 140 are handheld devices (e.g., terminal devices, mobile devices, cellular phones, personal digital assistant (PDA) devices, etc.). As used herein, the FUE and the MUE represent femtocell users and macrocell users, respectively. Also, one skilled in the art would understand that although the example presented herein is illustrated using FUEs, other users (such as but not limited to, microcells users, picocell users, etc.) may be equally applicable to the examples. The coverage area 118 of the femtocell 110 and the coverage area 138 of the macrocell 130 are also illustrated in FIG. 1. Also, note that the term "access terminal" (AT) generically applies to either a FUE or a MUE, and AT may be used synonymously for either FUE or MUE.

In one aspect, successful femtocell deployments require careful consideration regarding Reverse Link (RL) performance. For example, femtocells must be configured differently from macrocells to deal with challenging radio frequency (RF) interference. Non-uniform coverage areas of macrocells and femtocells may arise from large differences in forward link (FL) transmit power levels, restricted access to femtocells, lack of active macrocell to femtocell hand-in and/or presence of macro users (e.g., macro user equipment (MUE)) in close proximity to femtocells which are conditions that may necessitate the use of dynamic settings specialized for femtocell deployments for RL interference management.

Reverse link (RL) data rates of femto user equipments (FUEs) may be coupled to a rise-over-thermal (RoT) or noise rise (NR) level observed at the femtocell. In one aspect, RoT is defined as the ratio of the total received signals strength on a given carrier to the noise floor. If the RoT observed exceeds the operating RoT threshold, the data rate of the associated users may be reduced. In one example, a data rate reduction may be obtained through communicating a specific rate allocation to the femto user equipment (FUE) by the femtocell or through sending the FUE a busy indication that it can use as an input to determine the forward link (FL) data rate. In one aspect, the operating RoT threshold is a parameter that impacts the femtocell user experience.

In one example, a MUE near a femtocell deployment may continue to be served by the macrocell if access to the femtocell is restricted. Even if femtocell access is not restricted, the MUE which may already be on an active call while approaching the femtocell deployment may remain with the macrocell as long as the call is maintained, since active handover from the macrocell to the femtocell may not be supported. The MUE may transmit at a high power level to close the reverse link (RL) with a far away macrocell (i.e. macrocell forward link (FL) coverage may be much larger because of a very high FL transmit power level). Meanwhile, the MUE may cause high interference to the femtocell which may result in a high Rise over Thermal (RoT) level at the femtocell. In another aspect, the macrocell and the femtocell may operate on the same or on adjacent carriers. For example, a MUE may cause a high RoT level in a femtocell due to leakage to a femtocell carrier. Similarly, a FUE may cause a high RoT level in a macrocell due to leakage to a macrocell carrier.

In another example, for high RoT operation, FUE may need to increase its transmit power to overcome high macrocell interference. This high transmit power may create interference in the macrocell network, especially if the FUE is at the femtocell coverage boundary with low path loss to the macrocell. Another issue is that if the high RoT level exceeds a RoT threshold of the femtocell, data rates of associated femtocell users may get reduced.

In another aspect, since femtocells are likely to experience high RoT, one approach is to let the femtocells operate at a high RoT level by increasing the RoT threshold. However, the FUE may have to transmit at a higher power level when there is a high RoT level and therefore potentially impact the nearby macrocell. Therefore, the RL rate allocation may have to be determined by balancing the femtocell performance against the impact to the macrocell.

In one aspect, disclosed herein is an algorithm which utilizes mobile measurement reports (e.g., pilot strength reports) to adjust the RoT threshold and individual user allocations (e.g., data allocations of the FUE, etc.) to achieve better femtocell user performance without impacting the nearby macrocell. One skilled in the art would understand that the term "nearby" should not be restricted to imply a particular distance or location since whether a macrocell should be considered to be nearby or not may depend on various factors such as transmit power, interference level experienced, application, design choice, etc.

In one example, a femtocell requests pilot strength measurement(s) from active femtocell users (e.g., FUEs or mobile devices, etc.) with a certain reporting interval. In one example, when the macrocell operates on an adjacent channel, femtocell beacons may be transmitted as well. In this case, femtocell beacon and macrocell pilot strength measurements may be requested and reported. The femtocell may use these pilot strength reports to evaluate an interference amount that the FUE may create on the macrocell. And, the femtocell may adjust the data rate allocation of the FUE appropriately, for example, regardless of the RoT level, through signaling to minimize impact on the macrocell.

In another example, requesting and/or receiving pilot strength reports may be enabled all the time. In yet another example, requesting and/or receiving pilot strength reports may be enabled based on a trigger event, such as but not limited to, experiencing the presence of a large out-of-cell interference or a large RoT at the femtocell which may result in FUE to transmit at a higher power level and pose a greater risk to the nearby macrocell. In one example, once the cause of the trigger event disappears, the requesting and/or receiving pilot strength reports may be stopped or its reporting interval may be reduced.

In one example, for the FUE which is served by the femtocell, the RoT level (in dB) at the femtocell may be expressed as $$\text{RoT}_f = I_{o,femto} - N_{o,f} \qquad \text{Eqn. (1)}$$

where $N_{o,f}$ is the femtocell noise floor and $I_{o,femto}$ is the total received signal strength at the femtocell.

In one example, the FUE may need to transmit at a pilot power level, P, to achieve a required signal-to-noise ratio $(E_{cp}/I_o)_{target}$, such that its packets can be decoded. Note that the following equations are expressed in decibels (dB).

$$P - PL_f - I_{o,femto} = (E_{cp}/I_o)\text{target} \qquad \text{Eqn. (2)}$$

where $PL_f$ is the path loss from the FUE to the femtocell. P can be rewritten as:

$$P = PL_f + \text{RoT}_f + N_{o,f} + (E_{cp}/I_o)_{target} \qquad \text{Eqn. (3)}$$

In one example, the interference created by a pilot signal of the FUE, $I_{oc,macro}$, normalized by the macrocell noise floor, can be written as $$I_{oc,macro} - N_{o,m} = P - PL_m - N_{o,m} \qquad \text{Eqn. (4)}$$

where $N_{o,m}$ is the macrocell noise floor, $PL_m$ is the path loss from the FUE to the macrocell. In another aspect, in the case of nearby carrier macrocell/femtocell deployments, a leakage ratio from one carrier to another carrier may be accounted in an interference computation by the FUE. Substituting for P, the expression becomes $$I_{oc,macro} - N_{o,m} = (PL_f - PL_m) + RoT_f + (N_{o,f} - N_{o,m}) + (E_{cp}/I_o)_{target} \quad \text{Eqn. (5)}$$

In another example, to compute the interference caused by the FUE, the femtocell needs to know the path loss difference from the FUE to the femtocell and to the macrocell. In one example, this information may be obtained through the forward link (FL) measurement reports (e.g., pilot strength reports) on the macrocell and femtocell pilot or femtocell beacon strengths, with the assumption that the observed FL path loss and observed RL path loss values are similar. On the forward link (FL), $P_{m,FL}$ and $P_{f,FL}$ correspond to the macrocell and femtocell forward link (FL) transmit powers, respectively. And, $(E_{cp}/I_o)_{FL,macro}$ and $(E_{cp}/I_o)_{FL,femto}$ correspond to the FL signal-to-noise ratio at the macrocell and femtocell, respectively. Assuming the femto and the macro operate on the same channel, $$(E_{cp}/I_o)_{FL,macro} - (E_{cp}/I_o)_{FL,femto} = (P_{m,FL} - P_{f,FL}) - (PL_m - PL_f) \quad \text{Eqn. (6)}$$

For dedicated channel deployment, $(E_{cp}/I_o)_{FL,femto}$ and $P_{f,FL}$ are replaced by the corresponding beacon values $(E_{cp}/I_o)_{FL,beacon}$ and $P_{beacon,FL}$.

In one example, obtaining path loss difference information from the above expression, Eqn. (6), interference at the macrocell may be written as $$I_{oc,macro} - N_{o,m} = RoT_f + (N_{o,f} - N_{o,m}) + [((E_{cp}/I_o)_{FL,macro} - (E_{cp}/I_o)_{FL,femto}] - (P_{m,FL} - P_{f,FL}) + (E_{cp}/I_o)_{target} \quad \text{Eqn. (7)}$$

Once the interference is estimated, the femtocell may decide how much additional traffic power the FUE can safely transmit or alternatively what reverse link data rate the FUE can use without causing any significant impact to the nearby macrocell. The traffic power or reverse link data rate information is then communicated to the FUE.

Figure 2:
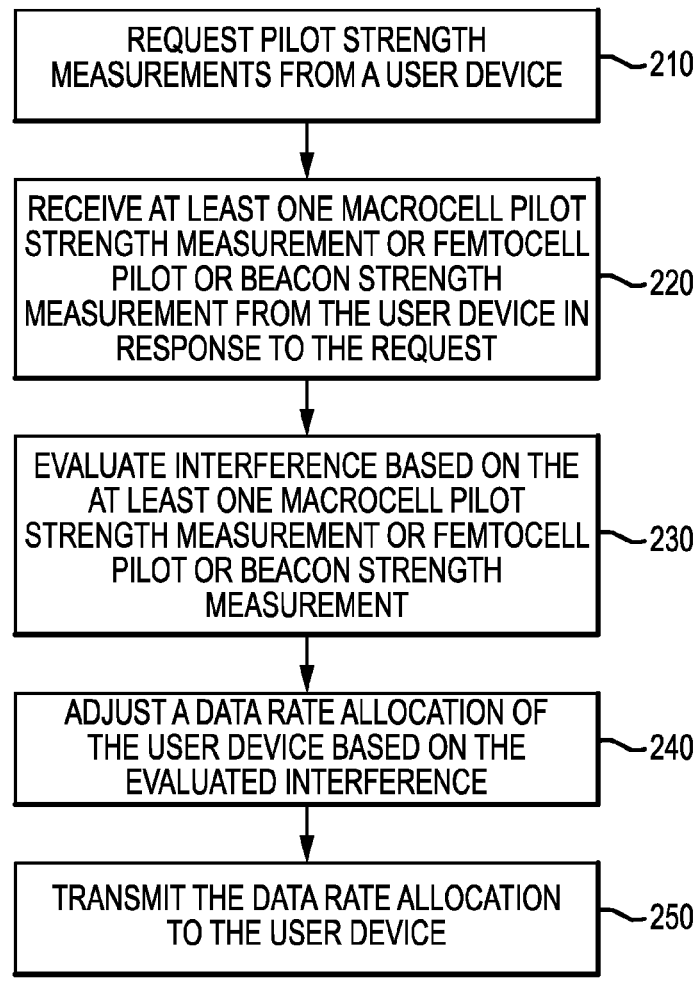
FIG. 2 illustrates an example flow diagram for providing mobile assisted reverse link (RL) interference management.

FIG. 2 illustrates an example flow diagram for providing mobile assisted reverse link (RL) interference management. In block 210, request pilot strength measurements from a user device. In block 220, receive at least one macrocell pilot strength measurement or femtocell pilot or beacon strength measurement from the user device in response to the request. In block 230, evaluate interference based on the at least one macrocell pilot strength measurement or femtocell pilot or beacon strength measurement. In one example, the interference is a reverse link (RL) interference. In block 240, adjust a data rate allocation of the user device based on the evaluated interference. Following block 240, in block 250, transmit the data rate allocation to the user device.

Figure 3:
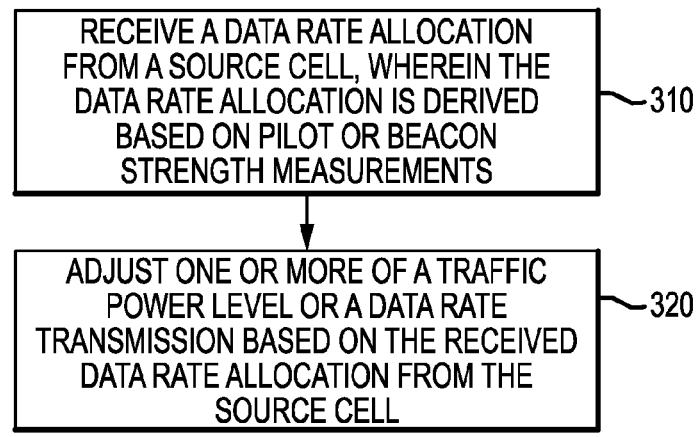
FIG. 3 illustrates an example flow diagram for providing mobile assisted reverse link (RL) interference management from the perspective of a user device.

FIG. 3 illustrates an example flow diagram for providing mobile assisted reverse link (RL) interference management from the perspective of a user device. In block 310, receive a data rate allocation from a source cell, wherein the data rate allocation is derived based on pilot or beacon strength measurements. In one example, the source cell is one of a macrocell, a femtocell, a microcell or a picocell. In one example, the pilot strength measurements include pilot strength measurements from a femtocell and a macrocell. Following block 310, in block 320, adjust one or more of a traffic power level or a data rate transmission based on the received data rate allocation from the source cell.

Although some of the examples illustrated herein may refer to a single FUE, a single femtocell, a single MUE and/or a single macrocell, one skilled in the art would understand that the example illustrated may be expanded to include multiple FUEs, multiple femtocells, multiple MUEs and/or multiple macrocells without affecting the spirit or scope of the present disclosure.

Figure 4:
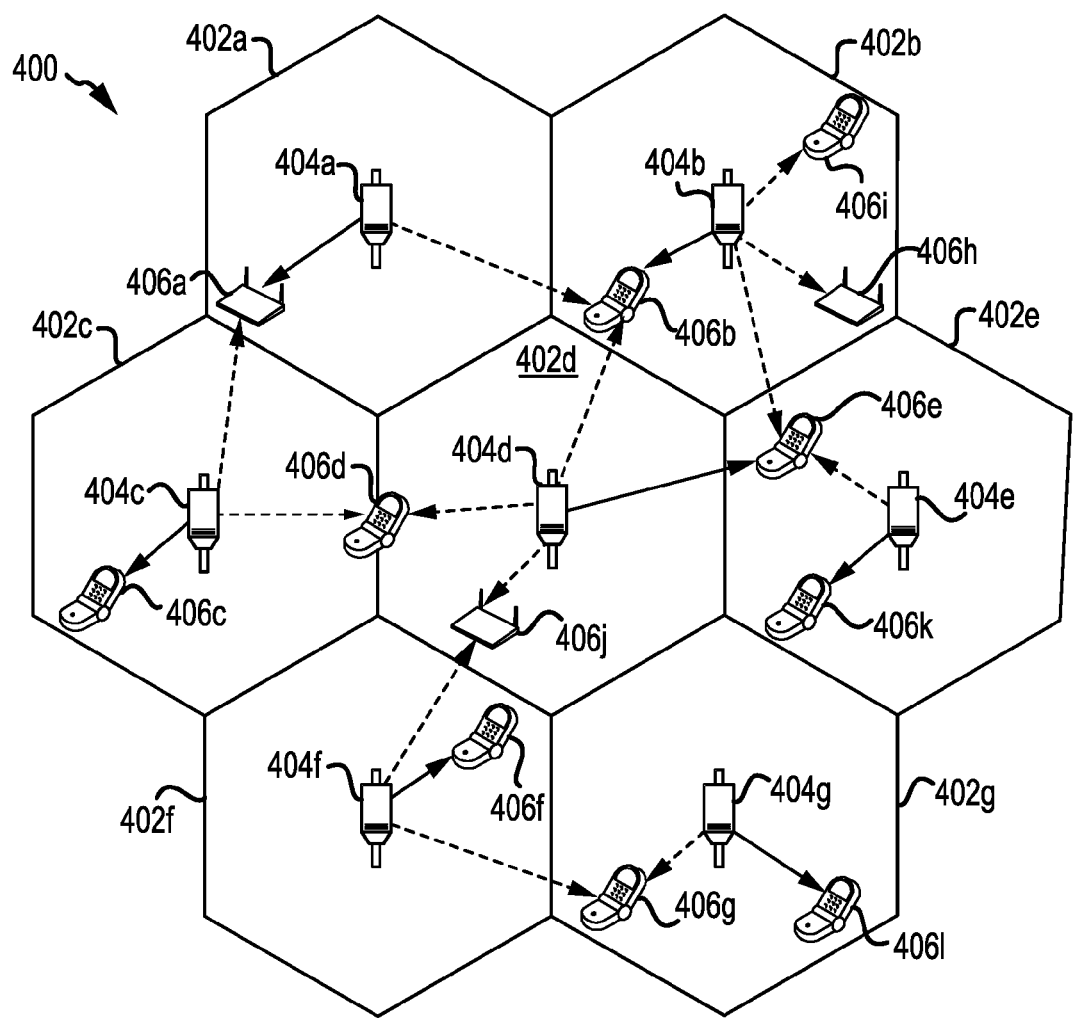
FIG. 4 illustrates an example diagram of a wireless communication system configured to support a number of user devices.

FIG. 4 illustrates an example diagram of a wireless communication system configured to support a number of user devices, in which the disclosure herein is implemented. The system 400 provides communication for multiple cells 402, such as, for example, macrocells 402a-402g, with each cell being serviced by a corresponding access node 404 (e.g., access nodes 404a-404g). As shown in FIG. 4, user devices 406 (e.g., user devices 406a-406l) may be dispersed at various locations throughout the system over time. Each user device 406 may communicate with one or more access nodes 404 on a forward link ("FL") and/or a reverse link ("RL") at a given moment, depending upon whether the user device 406 is active and whether it is in soft handoff, for example. The wireless communication system 400 may provide service over a large geographic region. For example, macrocells 402a-402g may cover a few blocks in a neighborhood.

Figure 5:
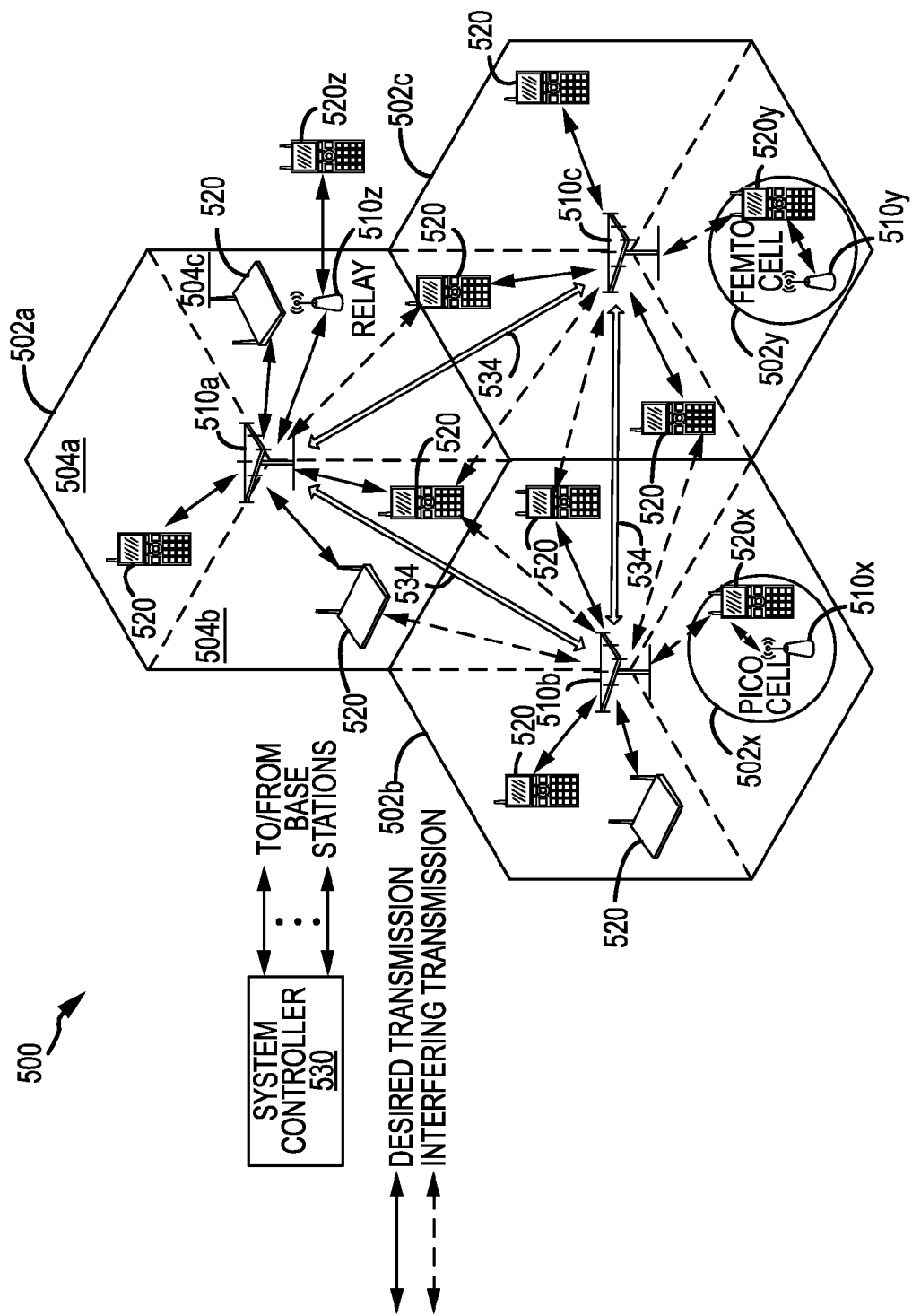
FIG. 5 illustrates an example diagram of a wireless communication system including macrocells, femtocells and picocells.

FIG. 5 illustrates an example diagram of a wireless communication system 500 including macrocells, femtocells and picocells. In the example shown in FIG. 5, base stations 510a, 510b and 510c may be macro base stations for macrocells 502a, 502b and 502c, respectively. Base station 510x may be a pico base station for a picocell 502x communicating with user device 520x. Base station 510y may be a femto base station for a femtocell 502y communicating with user device 520y. Although not shown in FIG. 5 for simplicity, the macrocells may overlap at the edges. The pico and femto cells may be located within the macrocells (as shown in FIG. 5) or may overlap with macrocells and/or other cells.

The wireless communication system 500 may also include relay stations, e.g., a relay station 510z that communicates with user device 520z. A relay station is a station that receives a transmission of data and/or other information from an upstream station and sends a transmission of the data and/or other information to a downstream station. The upstream station may be a base station, another relay station, or a user device. The downstream station may be a user device, another relay station, or a base station. A relay station may also be a user device that relays transmissions for other user devices. A relay station may transmit and/or receive low reuse preambles. For example, a relay station may transmit a low reuse preamble in similar manner as a pico base station and may receive low reuse preambles in similar manner as a user device.

A system controller 530 may couple to a set of base stations and provide coordination and control for these base stations. The system controller 530 may be a single network entity or a collection of network entities. The system controller 530 may communicate with base stations 510 via a backhaul. Backhaul network communication 534 can facilitate point-to-point communication between base stations 510a-510c employing such a distributed architecture. Base stations 510a-510c may also communicate with one another, e.g., directly or indirectly via wireless or wireline backhaul.

The wireless communication system 500 may be a homogeneous communication system that includes only macro base stations (not shown in FIG. 5). The wireless communication system 500 may also be a heterogeneous communication system that includes base stations of different types, e.g., macro base stations, pico base stations, home base stations, relay stations, etc. These different types of base stations may have different transmit power levels, different coverage areas, and different impact on interference in the wireless communication system 500. For example, macro base stations may have a high transmit power level (e.g., 20 Watts) whereas pico and femto base stations may have a low transmit power level (e.g., 10 Watt). The techniques described herein may be used for homogeneous and heterogeneous communication systems.

User devices 520 may be dispersed throughout the wireless communication system 500, and each user device may be stationary or mobile. For example, a user device may also be referred to as an access terminal (AT), a mobile station (MS), user equipment (UE), a subscriber unit, a station, etc. Further example, a user device may be a cellular phone, a personal digital assistant (PDA), a wireless modem, a wireless communication device, a handheld device, a laptop computer, a cordless phone, a wireless local loop (WLL) station, etc. A user device may communicate with a base station via the downlink and uplink. The downlink (or forward link) refers to the communication link from the base station to the user device, and the uplink (or reverse link) refers to the communication link from the user device to the base station.

A user device may be able to communicate with macro base stations, pico base stations, femto base stations, and/or other types of base stations. In FIG. 5, a solid line with double arrows indicates desired transmissions between a user device and a serving base station, which is a base station designated to serve the user device on the downlink and/or uplink. A dashed line with double arrows indicates interfering transmissions between a user device and a base station. An interfering base station is a base station causing interference to a user device on the downlink and/or observing interference from the user device on the uplink.

The wireless communication system 500 may support synchronous or asynchronous operation. For synchronous operation, the base stations may have the same frame timing, and transmissions from different base stations may be aligned in time. For asynchronous operation, the base stations may have different frame timing, and transmissions from different base stations may not be aligned in time. Asynchronous operation may be more common for pico and femto base stations, which may be deployed indoors and may not have access to a synchronizing source such as Global Positioning System (GPS).

In one aspect, to improve system capacity, the coverage area 502a, 502b, or 502c corresponding to a respective base station 510a-510c can be partitioned into multiple smaller areas (e.g., areas 504a, 504b, and 504c). Each of the smaller areas 504a, 504b, and 504c can be served by a respective base transceiver subsystem (BTS, not shown). As used herein and generally in the art, the term "sector" can refer to a BTS and/or its coverage area depending on the context in which the term is used. In one example, sectors 504a, 504b, 504c in a cell 502a, 502b, 502c can be formed by groups of antennas (not shown) at base station 510, where each group of antennas is responsible for communication with user devices 520 in a portion of the cell 502a, 502b, or 502c. For example, a base station 510 serving cell 502a can have a first antenna group corresponding to sector 504a, a second antenna group corresponding to sector 504b, and a third antenna group corresponding to sector 504c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. It should be appreciated that as used herein, a downlink sector in a disjoint link scenario is a neighbor sector. While the following description generally relates to a system in which each user device communicates with one serving access point for simplicity, it should be appreciated that user devices can communicate with any number of serving access points.

Figure 6:
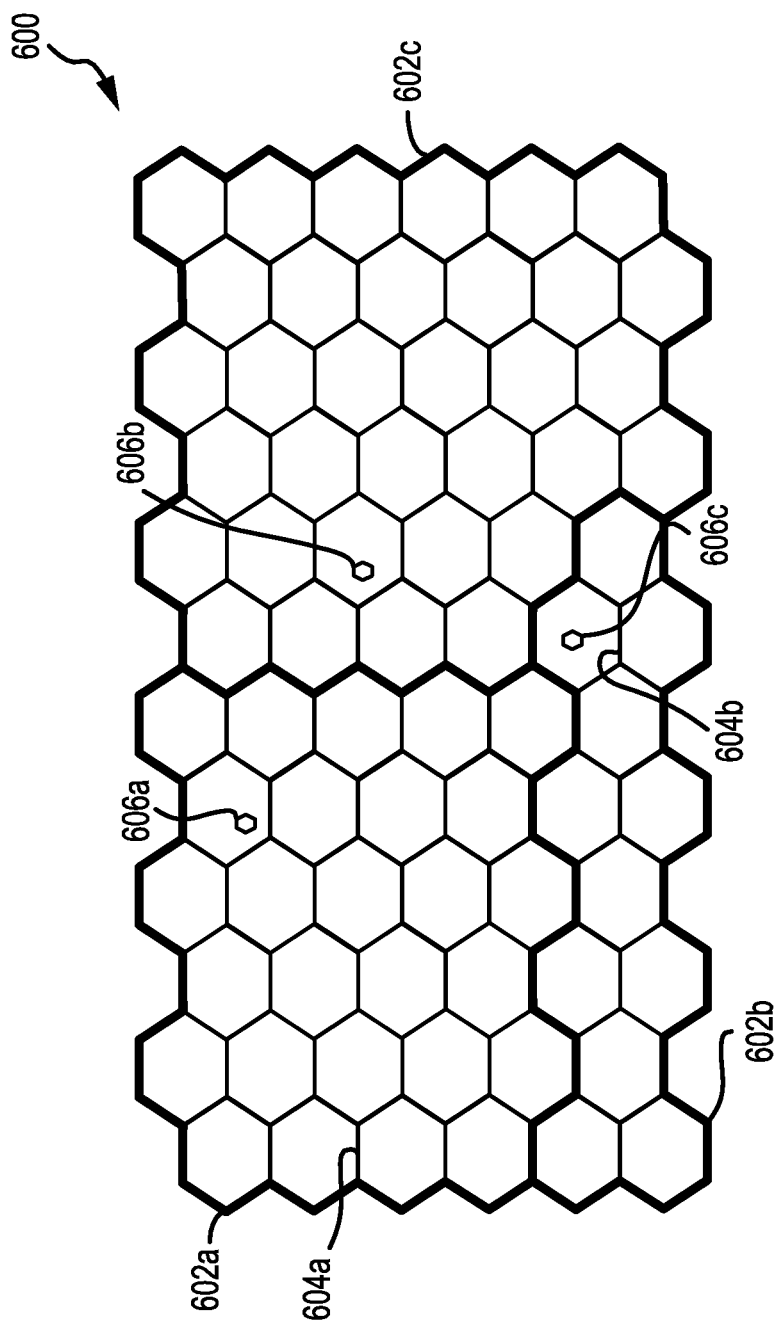
FIG. 6 illustrates an example of a coverage map where several tracking areas (or routing areas or location areas) are defined, each of which includes several macro coverage areas.

FIG. 6 illustrates an example of a coverage map 600 where several tracking areas 602 (or routing areas or location areas) are defined, each of which includes several macro coverage areas 604. Areas of coverage associated with tracking areas 602a, 602b, and 602c are delineated by the wide lines and the macro coverage areas 604 are represented by the hexagons. The tracking areas 602 also include femto coverage areas 606. In this example, each of the femto coverage areas 606 (e.g., femto coverage area 606c) is depicted within a macro coverage area 604 (e.g., macro coverage area 604b). It should be appreciated, however, that a femto coverage area 606 may not lie entirely within a macro coverage area 604. In practice, a large number of femto coverage areas 606 may be defined with a given tracking area 602 or macro coverage area 604. Also, one or more pico coverage areas (not shown) may be defined within a given tracking area 602 or macro coverage area 604.

In one example, the owner of a femtocell may subscribe to mobile service, such as, for example, 3G mobile service, offered through a mobile operator core network. In addition, a user device may be capable of operating both in macro environments and in smaller scale (e.g., residential) network environments. In other words, depending on the current location of the user device, the user device may be served by an access node of the macrocell mobile network or by any one of a set of femtocells (e.g., the femtocells that reside within a corresponding user residence). For example, when a subscriber is outside his home, he is served by a standard macro access node and when the subscriber is at home, he is served by a femtocell. It should be appreciated that a femtocell may be backward compatible with existing user devices.

A femtocell may be deployed on a single frequency or, in the alternative, on multiple frequencies. Depending on the particular configuration, the single frequency or one or more of the multiple frequencies may overlap with one or more frequencies used by a macrocell.

In some aspects, a user device may be configured to connect to a preferred femtocell (e.g., the home femtocell of the user device) whenever such connectivity is possible. For example, whenever the user device is within the user's residence, it may be desired that the user device communicate only with the home femtocell.

In some aspects, if the user device operates within the macro mobile network but is not residing on its most preferred network (e.g., as defined in a preferred roaming list), the user device may continue to search for the most preferred network (e.g., the preferred femtocell) using a Better System Reselection ("BSR"), which may involve a periodic scanning of available systems to determine whether better systems are currently available, and subsequent efforts to associate with such preferred systems. With the acquisition entry, the user device may limit the search for specific band and channel. For example, the search for the most preferred system may be repeated periodically. Upon discovery of a preferred femtocell, the user device selects the femtocell for camping within its coverage area.

In one aspect, the femtocell may be restricted. For example, a given femtocell may only provide certain services to certain user devices. In deployments with so-called restricted (or closed) association, a given user device may only be served by the macrocell mobile network and a defined set of femtocells (e.g., the femtocells that reside within the corresponding user residence).

In some aspects, a restricted femtocell (which may also be referred to as a Closed Subscriber Group Home NodeB) is one that provides service to a restricted provisioned set of user devices. This set may be temporarily or permanently extended as necessary. In some aspects, a Closed Subscriber Group ("CSG") may be defined as the set of access nodes (e.g., femtocells) that share a common access control list of user devices. A channel on which all femtocells (or all restricted femtocells) in a region operate may be referred to as a femto channel.

Various relationships may thus exist between a given femtocell and a given user device. For example, from the perspective of a user device, an open femtocell may refer to a femtocell with no restricted association. A restricted femtocell may refer to a femtocell that is restricted in some manner (e.g., restricted for association and/or registration). A home femtocell may refer to a femtocell on which the user device is authorized to access and operate on. A guest femtocell may refer to a femtocell on which a user device is temporarily authorized to access or operate on. An alien femtocell may refer to a femtocell on which the user device is not authorized to access or operate on, except for perhaps emergency situations (e.g., 911 calls).

From a restricted femtocell perspective, a home user device may refer to a user device that is authorized to access the restricted femtocell. A guest user device may refer to a user device with temporary access to the restricted femtocell. An alien user device may refer to a user device that does not have permission to access the restricted femtocell, except for perhaps emergency situations, for example, such as 911 calls (e.g., a user device that does not have the credentials or permission to register with the restricted femtocell).

For convenience, the disclosure herein describes various functionality in the context of a femtocell. It should be appreciated, however, that a picocell, a microcell or another low power base station may provide the same or similar functionality for a larger coverage area. For example, a picocell may be restricted and a home picocell may be defined for a given user device.

A wireless multiple-access communication system may simultaneously support communication for multiple wireless user devices. As mentioned above, each user device may communicate with one or more base stations via transmissions on the forward and reverse links. The forward link (or downlink) refers to the communication link from the base stations to the user devices, and the reverse link (or uplink) refers to the communication link from the user devices to the base stations. This communication link may be established via a single-in-single-out system, a multiple-in-multiple-out ("MIMO") system, or some other type of system.

Figure 7:
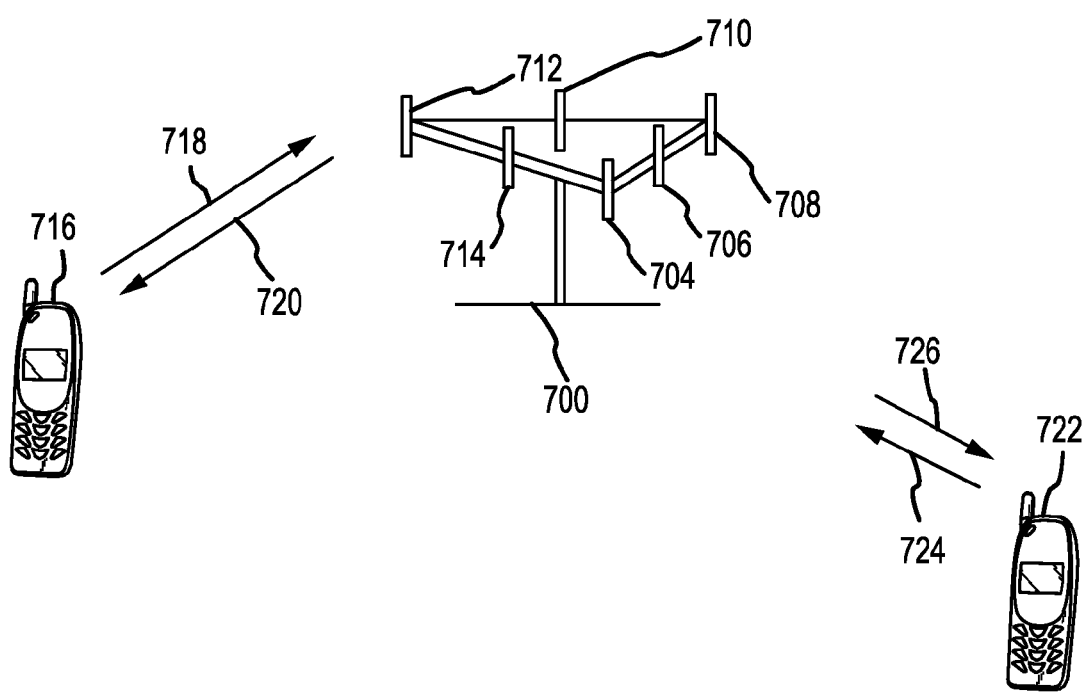
FIG. 7 illustrates an example diagram of a multiple access wireless communication system.

FIG. 7 illustrates an example diagram of a multiple access wireless communication system. An access point (AP) 700 includes multiple antenna groups, one including 704 and 706, another including 708 and 710, and an additional including 712 and 714. In FIG. 7, only two antennas are shown for each antenna group, however, more or fewer antennas may be utilized for each antenna group. User device 716 is in communication with antennas 712 and 714, where antennas 712 and 714 transmit information to user device 716 over forward link 720 and receive information from user device 716 over reverse link 718. User device 722 is in communication with antennas 706 and 708, where antennas 706 and 708 transmit information to user device 722 over forward link 726 and receive information from user device 722 over reverse link 724. In a FDD system, communication links 718, 720, 724 and 726 may use different frequencies for communication. For example, forward link 720 may use a different frequency then that used by reverse link 718.

Each group of antennas and/or the area in which they are designed to communicate may be referred to as a sector of the access point. In one aspect, antenna groups are designed to communicate to user devices in a sector, of the areas covered by the access point 700. In communication over forward links 720 and 726, the transmitting antennas of access point 700 utilize beamforming in order to improve the signal-to-noise ratio of forward links for the different user devices 716 and 722. Also, an access point using beamforming to transmit to user devices scattered randomly through its coverage causes less interference to user devices in neighboring cells than an access point transmitting through a single antenna to all of its user devices. An access point may be a fixed station used for communicating with the user devices and may also be referred to as a Node B, eNodeB or some other terminology.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 8:
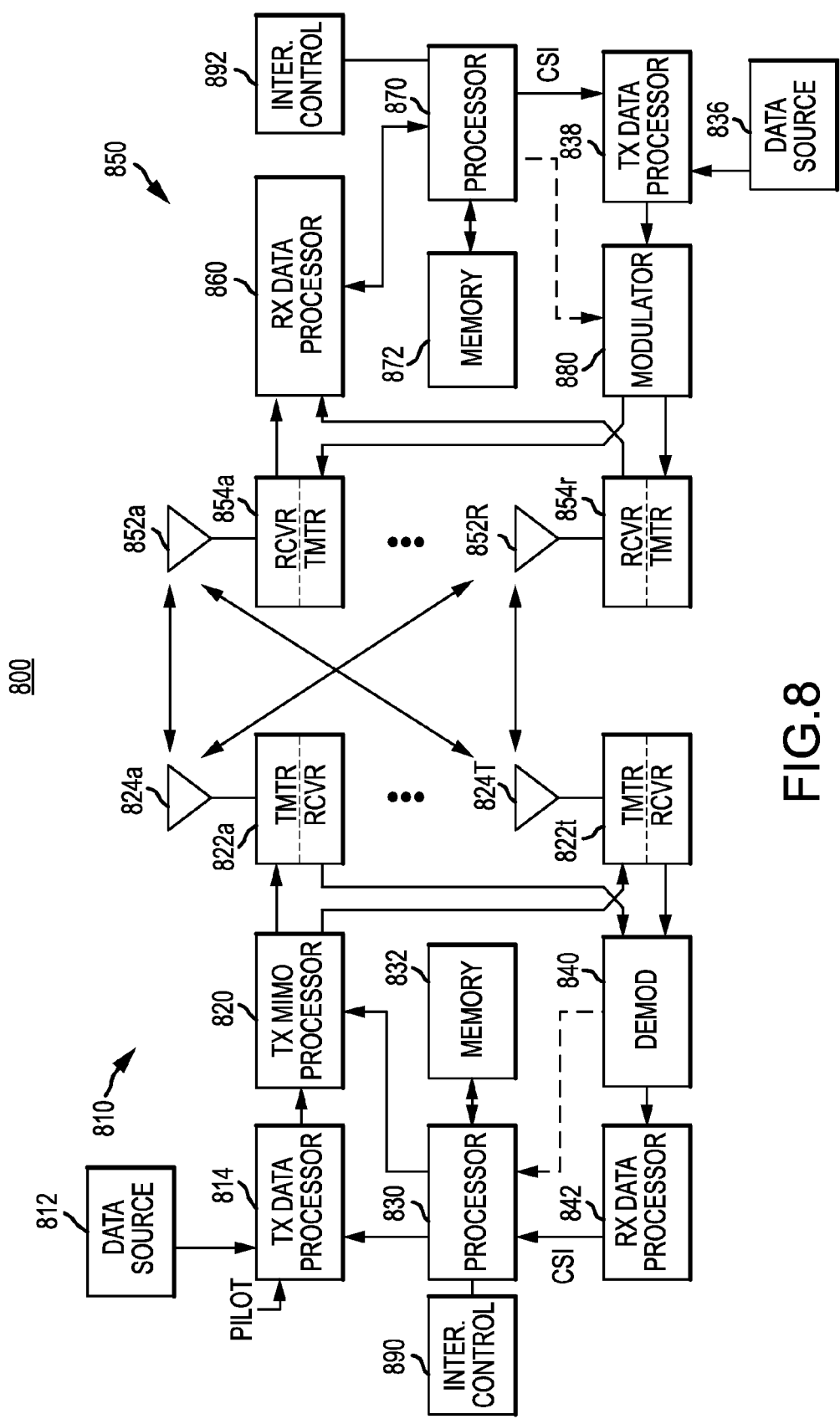
FIG. 8 illustrates an example schematic diagram of a multiple input multiple output (MIMO) communication system.

FIG. 8 illustrates an example schematic diagram of a multiple input multiple output (MIMO) communication system. Specifically, FIG. 8 illustrates an access point 810 and a user device 850 of a MIMO system 800. In one example, the access point 810 is one of the following: a femtocell, a microcell or a picocell. In another example, the access point 810 is a macrocell. At the access point 810, traffic data for a number of data streams is provided from a data source 812 to a transmit ("TX") data processor 814.

In some aspects, each data stream is transmitted over a respective transmit antenna. The TX data processor 814 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 830. A data memory 832 may store program code, data, and other information used by the processor 830 or other components of the access point 810.

The modulation symbols for all data streams are then provided to a TX MIMO processor 820, which may further process the modulation symbols (e.g., for OFDM). The TX MIMO processor 820 then provides $N_T$ modulation symbol streams to $N_T$ transceivers ("XCVR") 822a through 822t. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822a through 822t are then transmitted from $N_T$ antennas 824a through 824t, respectively.

At the user device 850, the transmitted modulated signals are received by $N_R$ antennas 852a through 852r and the received signal from each antenna 852 is provided to a respective transceiver ("XCVR") 854a through 854r. Each transceiver 854 conditions (e.g., filters, amplifies, and downconverts) a respective received signal, digitizes the conditioned signal to provide samples, and further processes the samples to provide a corresponding "received" symbol stream.

A receive ("RX") data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the access point 810.

A processor 870 periodically determines which pre-coding matrix to use (discussed below). The processor 870 formulates a reverse link message comprising a matrix index portion and a rank value portion. A data memory 872 may store program code, data, and other information used by the processor 870 or other components of the user device 850.

The reverse link message may comprise various types of information regarding the communication link and/or the received data stream. The reverse link message is then processed by a TX data processor 838, which also receives traffic data for a number of data streams from a data source 836, modulated by a modulator 880, conditioned by the transceivers 854a through 854r, and transmitted back to the access point 810.

At the access point 810, the modulated signals from the user device 850 are received by the antennas 824, conditioned by the transceivers 822, demodulated by a demodulator ("DEMOD") 840, and processed by a RX data processor 842 to extract the reverse link message transmitted by the user device 850. The processor 830 then determines which pre-coding matrix to use for determining the beam-forming weights then processes the extracted message.

FIG. 8 also illustrates that the communication components may include one or more components that perform interference control operations as taught herein. For example, an interference ("INTER.") control component 890 may cooperate with the processor 830 and/or other components of the access point 810 to send/receive signals to/from another device (e.g., user device 850) as taught herein. Similarly, an interference control component 892 may cooperate with the processor 870 and/or other components of the user device 850 to send/receive signals to/from another device (e.g., access point 810). It should be appreciated that for each access point 810 and user device 850 the functionality of two or more of the described components may be provided by a single component. For example, a single processing component may provide the functionality of the interference control component 890 and the processor 830 and a single processing component may provide the functionality of the interference control component 892 and the processor 870.

Figure 9:
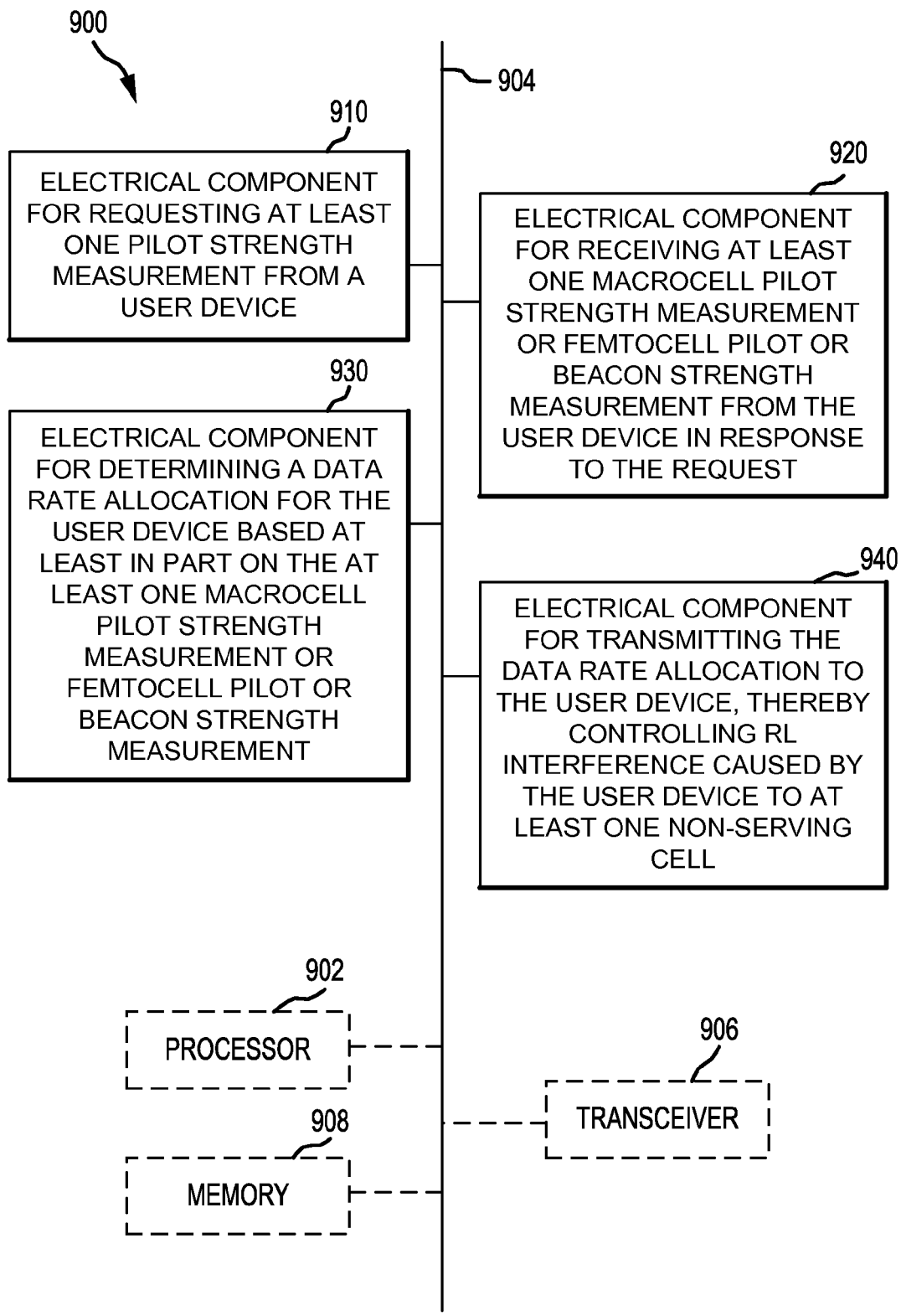
FIG. 9 illustrates an example device for providing mobile assisted reverse link (RL) interference management.

FIG. 9 illustrates an example device 900 for providing mobile assisted reverse link (RL) interference management. The device 900 may be configured as a communication device or as a processor or similar device for use within the communication device. As depicted, device 900 may include functional blocks that can represent functions implemented by a processor, software, hardware or combination thereof (e.g., firmware).

As illustrated, device 900 may include an electrical component 910 for requesting at least one pilot strength measurement from a user device. The device 900 may include an electrical component 920 for receiving at least one macrocell pilot strength measurement or femtocell pilot or beacon strength measurement from the user device in response to the request. The device 900 may include an electrical component 930 for determining a data rate allocation for the user device based at least in part on the at least one macrocell pilot strength measurement or femtocell pilot or beacon strength measurement. The device 900 may include an electrical component 940 for transmitting the data rate allocation to the user device, thereby controlling RL interference caused by the user device to at least one non-serving cell.

Device 900 may optionally include a processor module 902 having at least one processor. In one aspect, device 900 may be configured as a communication network entity, rather than as a processor. Processor 902, in such case, may be in operative communication with electrical components 910-940 via a bus 904 or a similar communication coupling. Processor 902 may effect initiation and scheduling of the processes or functions performed by electrical components 910-940.

In related aspects, device 900 may include a transceiver module 906. A stand-alone receiver and/or stand-alone transmitter may be used in lieu of or in conjunction with transceiver module 906. In further related aspects, device 900 may optionally include a module for storing information, such as, for example, a memory module 908. The memory module 908 may include a computer readable medium and may be operatively coupled to the other components of device 900 via a bus 904 or the like. The memory module 908 may be adapted to store computer readable codes, instructions and/or data for effecting the processes and behavior of electrical components 910-940, and subcomponents thereof, or processor 902, or the methods disclosed herein. Memory module 908 may retain codes/instructions for executing functions associated with electrical components 910-940. While shown as being external to memory module 908, it is to be understood that electrical components 910-940 may exist within memory module 908.

Figure 10:
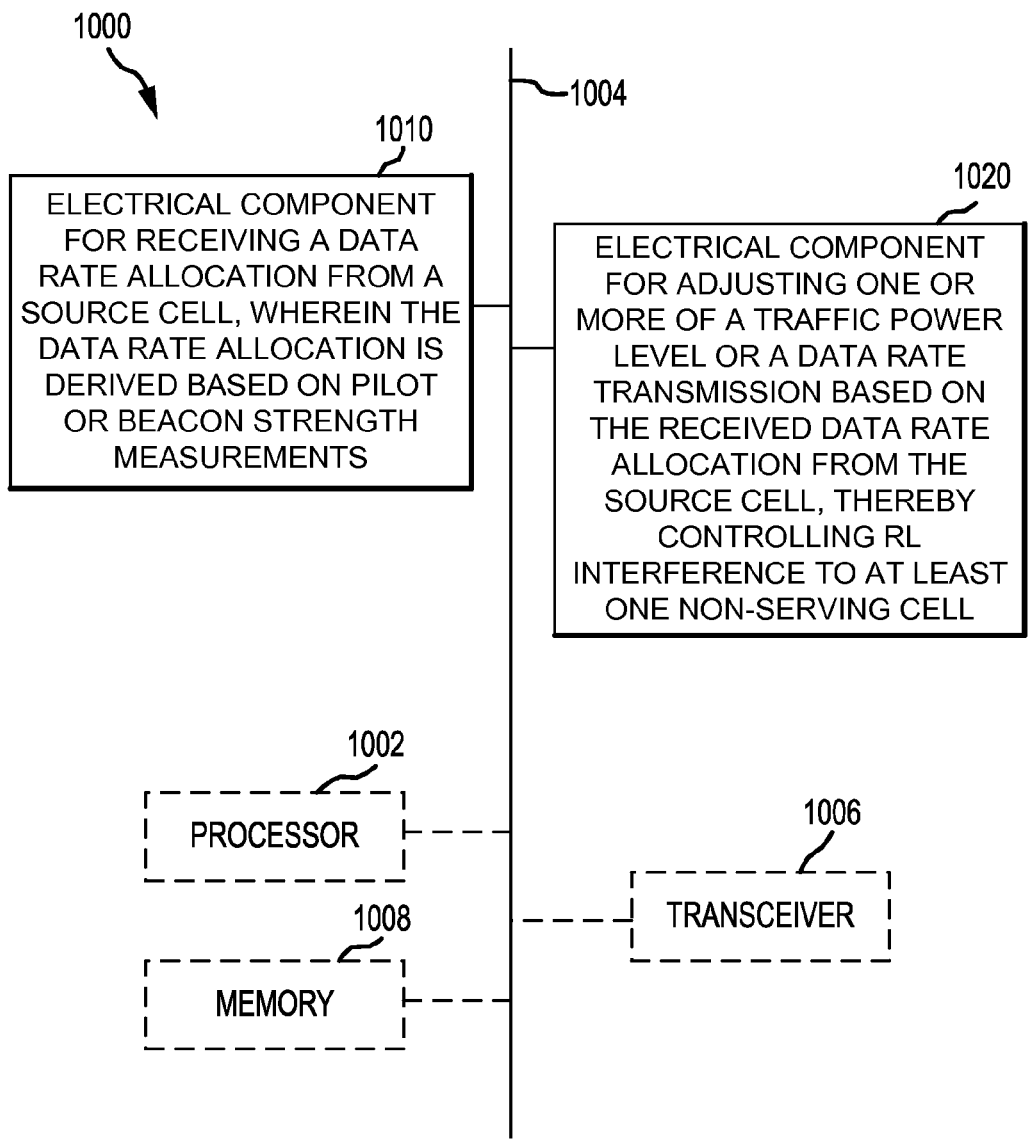
FIG. 10 illustrates an example device for providing mobile assisted reverse link (RL) interference management from the perspective of a user device.

FIG. 10 illustrates an example device 1000 for providing mobile assisted reverse link (RL) interference management from the perspective of a user device. The device 1000 may be configured as a communication device or as a processor or similar device for use within the communication device. As depicted, device 1000 may include functional blocks that can represent functions implemented by a processor, software, hardware or combination thereof (e.g., firmware).

As illustrated, device 1000 may include an electrical component 1010 for receiving a data rate allocation from a source cell, wherein the data rate allocation is derived based on pilot or beacon strength measurements. In one example, the source cell is one of a femtocell, a microcell or a picocell. In one example, the pilot or beacon strength measurements include pilot or beacon strength measurements from a femtocell and a macrocell. The device 1000 may include an electrical component 1020 for adjusting one or more of a traffic power level or a data rate transmission based on the received data rate allocation from the source cell, thereby controlling RL interference to at least one non-serving cell.

Device 1000 may optionally include a processor module 1002 having at least one processor. In one aspect, device 1000 may be configured as a communication network entity, rather than as a processor. Processor 1002, in such case, may be in operative communication with electrical components 1010-1020 via a bus 1004 or a similar communication coupling. Processor 1002 may effect initiation and scheduling of the processes or functions performed by electrical components 1010-1020.

In related aspects, device 1000 may include a transceiver module 1006. A stand-alone receiver and/or stand-alone transmitter may be used in lieu of or in conjunction with transceiver module 1006. In further related aspects, device 1000 may optionally include a module for storing information, such as, for example, a memory module 1008. The memory module 1008 may include a computer readable medium and may be operatively coupled to the other components of device 1000 via a bus 1004 or the like. The memory module 1008 may be adapted to store computer readable codes, instructions and/or data for effecting the processes and behavior of electrical components 1010-1020, and subcomponents thereof, or processor 1002, or the methods disclosed herein. Memory module 1008 may retain codes/instructions for executing functions associated with electrical components 1010-1020. While shown as being external to memory module 1008, it is to be understood that electrical components 1010-1020 may exist within memory module 1008.

One skilled in the art would understand that the steps disclosed in the example flow diagram in FIGS. 2 and 3 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for providing mobile assisted reverse link (RL) interference management comprising:
   receiving, at a user device, a request from a source cell for at least one pilot strength measurement from the user device;
   in response to the request, sending from the user device, at least one macrocell pilot strength measurement or femtocell pilot or beacon strength measurement to the source cell, wherein the sending of the at least one macrocell pilot strength measurement or femtocell pilot or beacon strength measurement causes the source cell to determine a data rate allocation for the user device based at least in part on the at least one macrocell pilot strength measurement or femtocell pilot or beacon strength measurement to control RL interference caused by the user device to at least one non-serving cell;
   receiving, at the user device, the data rate allocation from the source cell; and
   adjusting, by the user device, one or more of a traffic power level or a data rate transmission based on the received data rate allocation from the source cell to control the RL interference to the at least one non-serving cell.

2. The method of claim 1, wherein the at least one non-serving cell comprises a macrocell.

3. The method of claim 1, wherein the data rate allocation is determined based at least in part on a threshold comprising at least one of a rise-over-thermal (RoT) or noise rise (NR).

4. The method of claim 1, wherein the request is based on a trigger event comprising at least one of out-of-cell interference or an RoT above a threshold.

5. A user device for providing mobile assisted reverse link (RL) interference management, comprising:
  a receiver operative to receive a request from a source cell for at least one pilot strength measurement from the user device;
  a transmitter operative to, in response to the request, send at least one macrocell pilot strength measurement or femtocell pilot or beacon strength measurement to the source cell, wherein the sending of the least one macrocell pilot strength measurement or femtocell pilot or beacon strength measurement causes the source cell to determine a data rate allocation for the user device based at least in part on the at least one macrocell pilot strength measurement or femtocell pilot or beacon strength measurement to control RL interference caused by the user device to at least one non-serving cell;
  the receiver further operative to receive the data rate allocation from the source cell; and
  an hardware adjustment module operative to adjust one or more of a traffic power level or a data rate transmission based on the received data rate allocation from the source cell to control the RL interference to the at least one non-serving cell.

6. A non-transitory computer-readable medium comprising code for causing at least one computer to:
  receive a request from a source cell for at least one pilot strength measurement from a user device;
  in response to the request send at least one macrocell pilot strength measurement or femtocell pilot or beacon strength measurement to the source cell, wherein the sending of the at least one macrocell pilot strength measurement or femtocell pilot or beacon strength measurement causes the source cell to determine a data rate allocation for the user device based at least in part on the at least one macrocell pilot strength measurement or femtocell pilot or beacon strength measurement to control RL interference caused by the user device to at least one non-serving cell;
  receive the data rate allocation from the source cell; and
  adjust one or more of a traffic power level or a data rate transmission based on the received data rate allocation from the source cell to control the RL interference to the at least one non-serving cell.

7. An apparatus for providing mobile assisted reverse link (RL) interference management, comprising:
  means for receiving, at a user device, a request from a source cell for at least one pilot strength measurement from the user device;
  means for, in response to the request, sending from the user device, at least one macrocell pilot strength measurement or femtocell pilot or beacon strength measurement to the source cell, wherein the sending of the at least one macrocell pilot strength measurement or femtocell pilot or beacon strength measurement causes the source cell to determine a data rate allocation for the user device based at least in part on the at least one macrocell pilot strength measurement or femtocell pilot or beacon strength measurement to control RL interference caused by the user device to at least one non-serving cell;
  means for receiving, at the user device, the data rate allocation from the source cell; and
  means for adjusting, by the user device, one or more of a traffic power level or a data rate transmission based on the received data rate allocation from the source cell to control the RL interference to the at least one non-serving cell.

* * * * *